United States Patent [19]
Reynolds

[11] Patent Number: 4,613,316
[45] Date of Patent: Sep. 23, 1986

[54] MOLDED CONSTANT VELOCITY COUPLING

[75] Inventor: David F. Reynolds, Wrentham, Mass.

[73] Assignee: Barry Wright Corporation, Newton, Mass.

[21] Appl. No.: 665,601

[22] Filed: Oct. 29, 1984

[51] Int. Cl.[4] .............................................. F16D 3/64
[52] U.S. Cl. ........................................ 464/85; 464/87; 464/137; 464/904
[58] Field of Search .................. 464/71, 73, 74, 76, 464/85, 87, 92, 93, 102, 106, 137, 147, 904, 89, 81, 138

[56] References Cited

U.S. PATENT DOCUMENTS

| | | | |
|---|---|---|---|
| 1,607,362 | 11/1926 | Powers | 464/85 |
| 1,671,436 | 5/1928 | Melott | 464/76 |
| 2,363,469 | 11/1944 | Goldschmidt | 464/89 X |
| 3,120,745 | 2/1964 | Saurer | 464/76 |
| 3,396,556 | 8/1968 | Giegerich | 464/73 |
| 3,438,221 | 4/1969 | Paulsen | 464/76 |
| 3,638,454 | 2/1972 | Croset | 464/76 |
| 3,677,033 | 7/1972 | Kneeland | 464/85 |
| 3,724,239 | 4/1973 | Calistrat | 464/92 |
| 3,830,081 | 8/1974 | Weber et al. | 464/76 X |

FOREIGN PATENT DOCUMENTS 1033971 7/1958 Fed. Rep. of Germany ........ 464/93

*Primary Examiner*—Stuart S. Levy
*Assistant Examiner*—Daniel P. Stodola
*Attorney, Agent, or Firm*—Schiller & Pandiscio

[57] ABSTRACT

A constant velocity coupling characterized by a hub made of a rigid material, a plurality of torque transmitting elements made of a rigid material, and elastomeric sections connecting the hub and the torque transmitting elements. The coupling consists of a female half and a male half and offers the advantage that the two halves may be molded in a single cavity mold, with the mating portions characteristic of the male half being added after the molding has been accomplished.

24 Claims, 4 Drawing Figures

4,613,316

MOLDED CONSTANT VELOCITY COUPLING

This invention pertains to constant velocity couplings and more particularly to an improved form of constant velocity coupling which employs elastomeric materials.

PRIOR ART

Interlocked flexible couplings are well known and are of various types, including constant velocity couplings. Examples of interlocked couplings for a pair of aligned shafts are presented by U.S. Pat. Nos. 3,545,585 and 3,724,239. Constant velocity couplings are a specific form of interlocked couplings and are exemplified by U.S. Pat. Nos. 1,022,909, 1,394,701, 1,522,351, 2,010,899, 3,066,502 and 4,368,050, and the references cited therein.

Simple elastomeric couplings are known which consist of two rigid plates (or cylinders) with a layer of elastomer between them. Such couplings are not torque rigid; nor are they properly characterized as constant velocity couplings. Some more advanced forms of elastomeric couplings incorporate rigid elements in the elastomer so as to act as torque transmitting members. Such couplings tend to exhibit higher misalignment capabilities than simple shear type couplings, and some of them do exhibit constant velocity characteristics. However, such couplings are typically not torque rigid. Other forms of elastomeric couplings utilize unbonded elastomeric elements sandwiched between rigid hubs with fingers which protrude into the elastomer. That form of coupling exhibits relatively high torsional rigidity, and usually does not have a constant velocity characteristic and accommodates motion largely by a sliding of the elastomer along the coupling fingers.

OBJECTS OF THE INVENTION

The primary object of the invention is to provide a bonded coupling which will provide constant velocity behavior, be torsionally rigid, and accommodate motions by shearing of the elastomer. The desired combination of results is accomplished by a unique arrangement of coupling elements.

A more specific object of the invention is to provide a torsionally rigid elastomeric coupling which may be used to transmit torque while accommodating angular, axial and parallel shaft misalignments.

Still another specific object of the invention is to provide a coupling which is characterized by a unique arrangement of bonded rigid (plastic) and flexible (elastomeric) members which combine to produce a constant velocity, torque rigid device which has an improved service life (in comparison to prior elastomeric couplings) due to equalization of elastomer strains.

Still a further object of the invention is to provide an improved elastomeric coupling wherein identical male and female halves may be molded and then assembled to produce a finished coupling.

Still other objects of the invention will be rendered obvious by the following detailed description of the invention which is to be considered together with the accompanying drawings.

These and other objects of the invention are achieved by providing a constant velocity coupling which consists of a male half and a female half each characterized by a hub made of a rigid material, a plurality of torque transmitting elements made of a rigid material, and elastomeric sections connecting the hub and the torque transmitting elements. The coupling offers the advantage that the two halves may be molded in a single mold, with the mating portions of the male half being added after the molding has been accomplished.

THE DRAWINGS

In the several figures, like numerals refer to like parts.

SUMMARY OF THE INVENTION

The foregoing objects are achieved by providing an elastomeric type coupling which comprises a molded male half and a molded female half which are assembled together. Each coupling half consists of a rigid hub assembly consisting of a center hub with a plurality of rigid radially-projecting spokes, an elastomer molded to the hub and the radially-projecting spokes, and a plurality of rigid torque transmitting elements which are embedded in the elastomer between the radially-projecting spokes. The elastomer fills the area between and mechanically secures the hub to the torque transmitting elements. In a preferred embodiment the torque transmitting members are shaped so as to permit the elastomer layers between the torque transmitting members and the hub spokes to be of constant thickness for the purpose of providing equalization of shear and compression strain. A further feature of the invention is to "core-out" the elastomer between the hub and the torque transmitting elements in order to adjust the degree of stiffness of the coupling. The two coupling halves may be identical with the exception of the mating features.

As a modification of the invention, an elastomer material may also be used to mechanically encapsulate each of the two mating halves, notably the the entire hub assembly and portions of the torque transmitting elements, for improved bond strength and service life.

Other features of the invention will be set forth in the following detailed description of a preferred and alternative embodiment of the invention.

SPECIFIC DESCRIPTION OF PREFERRED EMBODIMENT

Turning now to FIGS. 1–4, the coupling consists of a female half or component 2A and a male half or component 2B which are molded separately and then secured together in the manner hereinafter described.

Figures 2, 3:
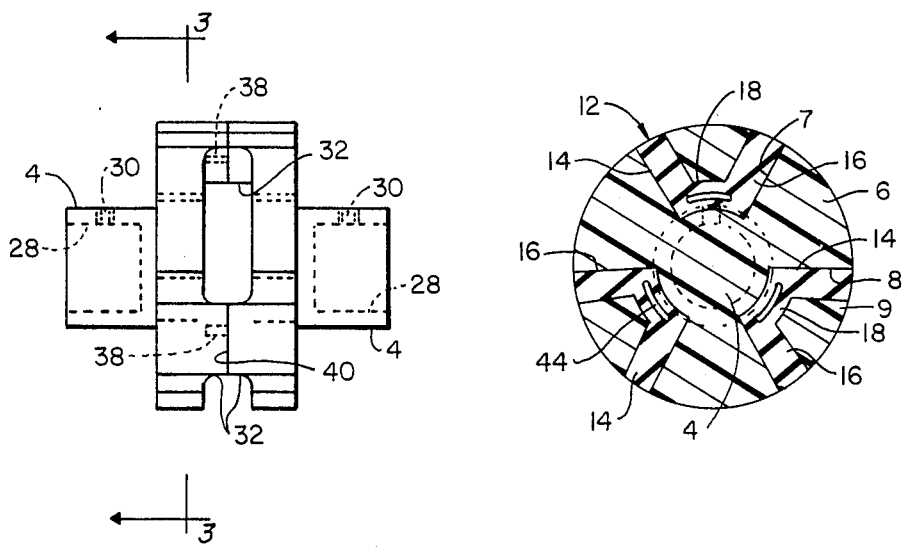
FIG. 2 is a side view in elevation of the same coupling.
FIG. 3 is a cross-sectional view taken along line 3—3 of FIG. 2.

The female half 2A of the coupling comprises a hub unit consisting of a cylindrical hub section 4 and three radially-extending spokes 6 formed as integral extensions of the hub. In this preferred embodiment spokes 6 have diverging sides 7 and 8 (actually as shown in FIG. 3 each of the spokes is generally similar in shape in cross-section to a trapezoid). The hub unit is molded of a rigid, i.e., stiff, material, preferably a plastic material such as acrylonitrile-butadiene styrene ("ABS").

Equally spaced and located between the three projecting spokes 6 are three rigid torque transmitting elements 9 made of the same material as hub 4 and spokes 6. Preferably, as shown in FIG. 3, each of the torque transmitting elements 9 has a generally trapezoidal shape in cross-section. These torque transmitting elements are molded and bonded to and supported by elastomeric connecting elements 12 which in turn are molded and bonded to and supported by the hub and spokes of the hub assembly. As shown in FIG. 3, the elastomeric connecting elements 12 are essentially U-shaped in cross-section, comprising diverging radially-extending leg sections 14 and 16 and a lateral connecting section 18 which extend around portions of hub 4. For purposes of strain equalization, the thickness of sections 14, 16 and 18 is controlled in accordance with the stiffness of the elastomer of which elements 12 are made. The elastomeric connecting elements 12 have front and rear surfaces 20 and 21 which are flush with the corresponding front and rear surfaces 22 and 23 of spokes 8.

Hub 4 is provided with an axial blind hole or bore 28 for receiving a shaft (not shown) which may be a driven or driving shaft. A threaded hole 30 extending radially in the hub is provided to accommodate a set screw (not shown) for securing the hub to a driving or driven shaft. An alternative method is to mold a "D" shaped axial blind hole in the hub to accept a shaft with a flat ground on it.

Figure 1:
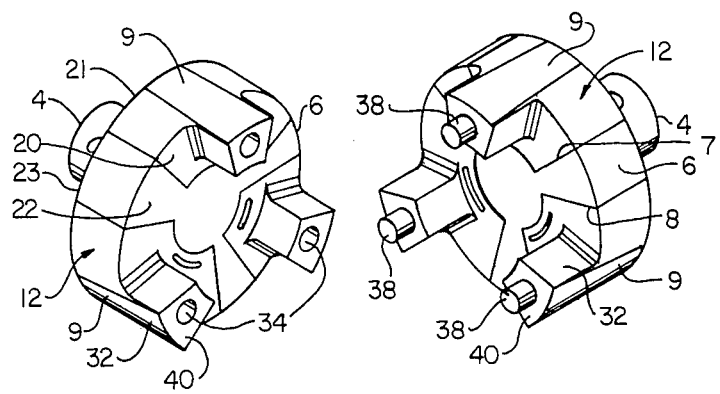
FIG. 1 is an exploded perspective view of a coupling constituting a preferred form of the present invention.

As seen in FIG. 1, the torque transmitting elements 9 project forwardly of the front surfaces of the elastomeric elements, so that a front portion 32 of the torque transmitting elements is available for coupling to a corresponding torque transmitting element of the male component. Each of the torque transmitting elements of the female coupling section is provided with a blind hole 34 at its forward end. The holes 34 extend parallel to the axis of the hub.

The male half 2B of the coupling is identical to the female half except that it is has a plurality of integrally-formed connecting pins or posts 38 which project forwardly of the forward ends of its torque transmitting elements 9. Posts 38 are sized so as to fit in the blind holes 34 of the torque transmitting elements of the female half of the coupling. The connecting posts are preferably secured to the torque transmitting elements of the female portion of the coupling by an adhesive. As an alternative measure, they may be affixed to the female components by ultrasonic bonding, a press fit, or by other suitable methods.

When the two coupling halves are assembled, the forward end surfaces 40 of the torque transmitting elements of the two halves preferably engage one another in the manner shown in FIG. 2.

When the coupling is mounted to and between a driving shaft and a driven shaft, the coupling will provide a constant velocity connection between the two shafts. In this connection it is to be noted that the coupling is torsionally rigid. On the other hand, it also accommodates motions by a shear-type deformation of the elastomer connecting elements 12. More particularly, in the event of angular, axial or parallel shaft alignments, the elastomeric sections 12 will be subjected to a distortion in the shear mode by the torque transmitting elements. The elastomeric sections will yield under the forces of misalignment in a shearing mode. On the other hand, as the driving shaft imparts torque to the coupling, the elastomeric elements collectively will act as a substantially torsionally rigid connection between hub 4 and spokes 6 on the one hand and torque transmitting elements 9 on the other hand. The elastomeric elements undergo shear uniformly about the floating members, so as to provide constant velocity coupling. In this connection it is to be noted that the coupling halves have equal stiffness, so the shearing action is equally distributed between the two halves of the coupling.

A significant feature of the invention is the manner in which the torque transmitting elements and the connecting elastomer sections are shaped. The trapezoidal shape shown in FIG. 3 is important since it permits sections 14 and 16 of elastomer connecting elements 12 to have equal thickness along their radial dimension, thereby facilitating equalization of strain.

It is to be understood that the two coupling members are preferably made using conventional molding methods. By way of example and not limitation, the hub assembly and the torque transmitting elements 10 may be preformed by compression or injection molding techniques. Then the hub assembly and the appropriate number of torque transmitting elements are placed in a suitable compression mold and the elastomeric sections 12 are molded in situ so as to be bonded to the hub assembly and the torque transmitting elements.

Various materials may be used to fabricate the hub unit and the torque transmitting elements. Preferably those components are made of a thermoplastic resin material so as to facilitate molding them in conventional molding equipment. By way of example, those components could be made of polypropylene or a poly methyl methacrylate composition having the required stiffness. Similarly, the elastomeric sections 12 may be made of various materials known to persons skilled in the art having the required resiliency. Thus, for example, the elastomeric sections 12 may be made of a thermoplastic elastomer material. In this connection it is to be noted that the term "thermoplastic elastomer" is already known to persons skilled in the art, as evidenced by Tobolsky et al, Polymer Science and Materials, page 277, Wiley-Interscience (1971); and that a variety of such materials exist as disclosed by B. A. Walker, Handbook of Thermoplastic Elastomers (1979). Still other suitable elastomers, e.g., synthetic or natural elastomers such as butadiene, silicone and neoprene elastomers, may be used in practicing the present invention.

MODIFICATIONS OF THE INVENTION

As seen in FIG. 3, it is contemplated to provide an arcuate hole or cavity 44 in the connecting section 18 of the elastomeric connecting elements. These cored-out sections or holes 44 are provided to adjust stiffness and also to facilitate strain equalization. The dimensions of holes 44 are adjusted in accordance with the stiffness and strain equalization requirements. These holes may be formed by means of an appropriate core member located in the mold which is used to form the particular coupling half section.

Figure 4:
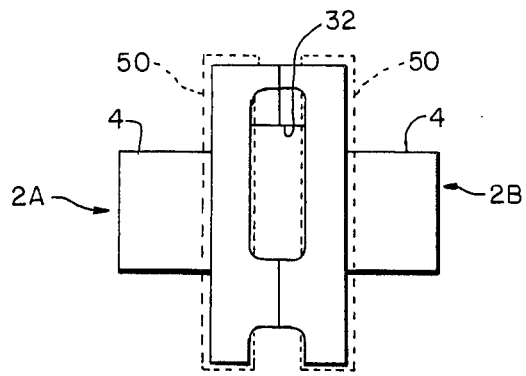
FIG. 4 is a side view in elevation of the same coupling wherein the two halves are each encapsulated in an elastomer.

Another modification is illustrated in FIG. 4. In this modification the two coupling halves are encapsulated in an elastomer sheath 50 (shown in dotted lines) for the purpose of extending the useful life of the coupling. It is preferred that elastomer sheath 50 be applied so that it covers only the spokes 6, connecting sections 12, and portions of torque transmitting elements 9. However, the front projecting portions 32 of the torque transmitting elements and the posts are not covered by the encapsulating elastomer. The encapsulating elastomer is limited in thickness for reasons of cost and also so as not to interfere with the operation of the coupling. Preferably the elastomer sheath has a thickness of about 0.010 inch.

The elastomeric sheath or encapsulation may be formed by placing the coupling half in a second suitable mold and compression molding the elastomeric sheath around the coupling. It may be formed of an elastomer which is the same as or different from the elastomer material of connecting elements 12.

ADVANTAGES OF THE INVENTION

The invention has a number of advantages. For one thing, the invention is simple to make, can be manufactured using simple and well known molding techniques, does not require complicated molding dies, and permits the coupling to be designed so as to assure equalization of strain while preserving rigid torque transmitting characteristics. A further advantage is that the two halves of the coupling are virtually identical, except that the female coupling is provided with the holes 34 for receiving posts 38 of the male coupling. If desired, posts 38 need not be formed as integral molded extensions of the torque-transmitting elements of the male half of the coupling. Instead the male section may be molded as a female section and then posts 38 (preformed separately) may be inserted in the holes 34 of that female section and affixed thereto (e.g. by a cement, press fit, or ultrasonic bonding), so as to form a male section corresponding to coupling half 2B. It is to be noted also that the invention may be modified in other ways. Thus for example, the number of spokes and torque tranmitting elements may be varied, e.g, each coupling half may have four or five spokes and torque-transmitting elements. Also the hub assembly and the torque-transmitting elements need not be made of the same material (however, the hub assembly and the torque-transmitting element should be made of a relatively stiff or rigid material). Similarly the front faces of the torque transmitting elements need not be flat and need not directly engage one another. The shape of the torque-transmitting elements also may be varied. Thus, for example, the outer circumferentially-extending surfaces of the torque-transmitting elements need not be curved the same as or be flush with the outer circumferentially-extending surfaces of the spokes and/or the elastomeric sections 12.

It is appreciated that other manufacturing techniques may be employed in making couplings embodying the present invention. Thus, for example, the two coupling halves may be made by a co-injection molding process similar to the one described in U.S. Pat. No. 4,385,025, issued May 24, 1983 to Charles M. Salerno et al for Vibration Isolators And Manufacture Thereof By Co-Injection Molding.

Still other advantages and modifications of the invention will be obvious to persons skilled in the art. Therefore, the invention is to be limited only by the following claims.

I claim:

1. A substantially constant velocity coupling comprising:
    first and second mutually confronting mating members;
    each of said mating members comprising:
    (1) a hub (4) adapted to be coaxially affixed to a shaft for rotation therewith, and a plurality of mutually-spaced spokes (6) formed integral with and projecting radially from said hub;
    (2) a plurality of torque transmitting elements (9) located between said spokes; and
    (3) a plurality of elastomeric connecting elements (12) located between said spokes and said torque transmitting elements in surrounding relation to said hub;
    said elastomeric connecting elements being bonded to said spokes, said torque transmitting elements and said hub so as to form a unitary assembly;
    said first and second mating members being arranged so that the said torque transmitting elements of said first mating member are aligned with the said torque transmitting elements of said second mating member; and
    said first mating member having cavities (34) in its said torque transmitting elements and said second mating member having posts (38) affixed to ends of its said torque transmitting elements which are received by said cavities, whereby said first and second mating members are coupled to one another.

2. A substantially constant velocity coupling according to claim 1 wherein said spokes have a circumferential dimension which increases with increasing distance from the center of said hub.

3. A substantially constant velocity coupling according to claim 2 wherein said torque transmitting elements have a circumferential dimension which increases with increasing distance from the center of said hub section.

4. A substantially constant velocity coupling according to claim 1 wherein said posts are formed integral with said second mating member.

5. A substantially constant velocity coupling according to claim 1 wherein said torque transmitting elements are made of a stiff or rigid material.

6. A substantially constant velocity coupling according to claim 1 wherein said torque transmitting elements are made of rigid synthetic plastic resin material.

7. A substantially constant velocity coupling according to claim 1 wherein said hub and said spokes are made of a stiff or rigid material.

8. A substantially constant velocity coupling according to claim 1 wherein said hub and said spokes are stiff and made of a synthetic plastic resin material.

9. A substantially constant velocity coupling according to claim 8 wherein said hub and said spokes are made of the same material as said torque transmitting elements.

10. A substantially constant velocity coupling according to claim 1 having cavities in said elastomeric connecting elements for controlling the stiffness and strain of said first and second mating members.

11. A substantially constant velocity coupling according to claim 1 wherein said elastomeric connecting elements are U-shaped in cross-section.

12. A substantially constant velocity coupling according to claim 11 wherein said torque transmitting elements are trapezoidal in cross-section.

13. A substantially constant velocity coupling according to claim 1 wherein each of said mating members has a front end and a rear end, with said torque transmitting elements projecting forwardly from said front ends, and said mating members are disposed so that their front ends are in confronting relation with one another.

14. A substantially constant velocity coupling for connecting two shafts together so as to cause one shaft to rotate with the other, said coupling comprising:

first and second mutually confronting mating coupling members;

said first and second coupling members each comprising:

(1) a hub adapted to be coaxially attached to a shaft for rotation therewith, and a plurality of mutually-spaced, radially-extending spokes formed as integral extensions of said hub;

(2) a plurality of torque transmitting elements located between said spokes; and (3) a plurality of elastomeric connecting elements located between said spokes and said torque transmitting elements in surrounding relation to said hub;

said elastomeric connecting elements being bonded to said spokes, said torque transmitting elements and said hub so as to form a unitary assembly;

said torque transmitting elements of each coupling member having end portions that project coaxially from a selected end of said each coupling member;

said first and second mating coupling members being disposed so the said projecting end portions of the torque transmitting elements of said first coupling member are in confronting and aligned relation with the said projecting end portions of the torque transmitting elements of said second coupling member;

said torque transmitting elements of said first coupling member having cavities in their said coaxially projecting end portions; and said torque transmitting elements of said second coupling member having posts on their said coaxially projecting end portions therof that are received by said cavities, whereby said coupling members are drivingly connected to one another by said posts.

15. A substantially constant velocity coupling according to claim 14 further characterized by cavities in said elastomeric connecting elements in radial alignment with said torque transmitting elements, said cavities being adapted to adjust for stiffness and also to facilitate strain equalization.

16. A substantially constant velocity coupling according to claim 14 wherein said posts are separately formed and are anchored in cavities in said torque transmitting elements of said second coupling member.

17. A substantially constant velocity coupling according to claim 14 wherein said posts are formed integral with said torque transmitting elements of said second coupling member.

18. A substantially constant velocity coupling according to claim 14 wherein said spokes have a circumferential dimension which increases with increasing distance from the center of said hub.

19. A substantially constant velocity coupling according to claim 14 wherein said torque transmitting elements have a circumferential dimension which increases with increasing distance from the center of said hub section.

20. A substantially constant velocity coupling according to claim 14 wherein said torque transmitting elements, said hub and said spokes are made of the same material.

21. A substantially constant velocity coupling according to claim 20 wherein said torque transmitting elements, said hub and said spokes are made of a synthetic plastic resin material.

22. A substantially constant velocity coupling according to claim 21 wherein said elastomeric connecting elements are made of a thermoplastic elastomer.

23. A substantially constant velocity coupling according to claim 14 further including elastomer sheaths partially encasing and bonded to said first and second coupling members.

24. A substantially constant velocity coupling according to claim 23 wherein said elastomer sheaths are arranged so as to leave exposed said projecting end portions of said torque transmitting elements.

* * * * *